United States Patent [19]

Dauvergne

[11] 4,325,447
[45] Apr. 20, 1982

[54] POWER-ASSISTED STEERING DEVICE AND THE MANUFACTURE THEREOF

[75] Inventor: Jean L. R. Dauvergne, Fosses, France

[73] Assignee: Societe Anonyme Francaise du Ferodo, Paris, France

[21] Appl. No.: 132,159

[22] Filed: Mar. 20, 1980

[30] Foreign Application Priority Data

Mar. 26, 1979 [FR] France .................................. 79 07530

[51] Int. Cl.$^3$ .............................................. B62D 5/08
[52] U.S. Cl. .................................. 180/132; 91/375 R; 137/625.21; 180/148
[58] Field of Search ............... 180/148, 146, 147, 132; 137/625.21; 91/375 R

[56] References Cited

U.S. PATENT DOCUMENTS

| 3,513,879 | 5/1970 | Adams | 91/375 X |
| 4,217,932 | 8/1980 | Bacardit | 180/132 X |
| 4,232,708 | 11/1980 | Miller | 180/132 |

FOREIGN PATENT DOCUMENTS 4212  9/1979  European Pat. Off. ............ 180/148

Primary Examiner—John A. Pekar

Attorney, Agent, or Firm—Young & Thompson

[57] ABSTRACT

The invention relates to a device for the power-assisted steering of a vehicle, of the kind comprising a steering column in two parts which are capable of limited relative angular displacement on either side of a neutral position. The assistor means are adapted to act on the steering system in the same sense as the steering column in response to this angular displacement, and comprise a hydraulic power source, a distributor, and an assisting jack. The distributor comprises stators connected to the power source and the jack, and two corresponding rotors each integral with a respective part of the steering column and being provided with passages for the hydraulic fluid. According to the invention, elastic means for returning the parts of the steering column to the neutral position comprise an elastic return arm integral with one of the rotors, which is connected to the other rotor, the neutral position of elastic return being coincident with a position of the rotors in which no fluid is directed to the assisting jack. The formation of the elastic means integrally with a rotor means that these parts can be formed by stamping from a single blank. The assembly is therefore cheaper and simpler than the previous torsion bar arrangements.

13 Claims, 18 Drawing Figures

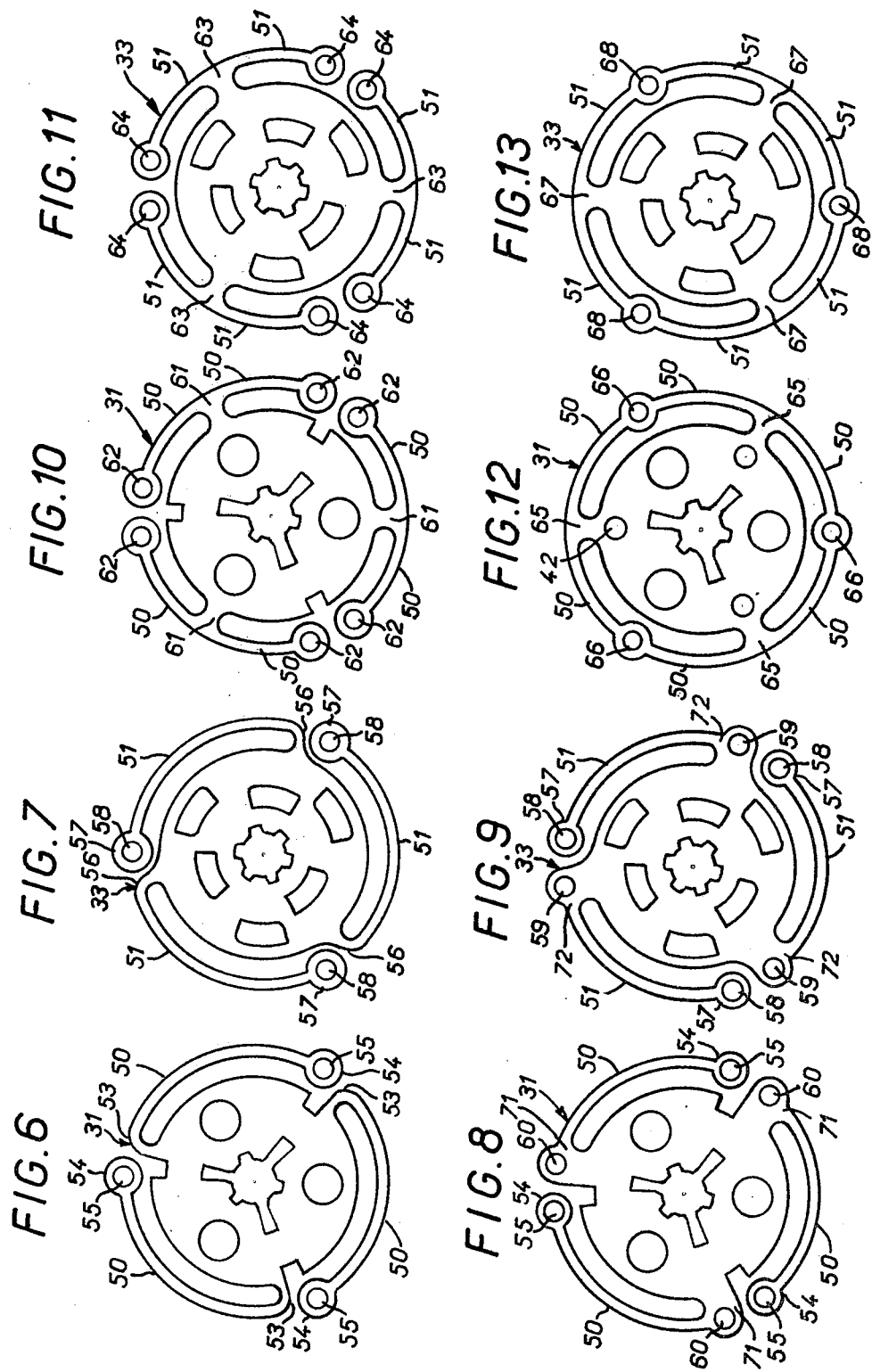

POWER-ASSISTED STEERING DEVICE AND THE MANUFACTURE THEREOF

BACKGROUND OF THE INVENTION

The present invention relates to a device for the power-assisted steering of a vehicle, which comprises control means acting on steering means, the said control means having a transmission element such as a steering column in two parts which are capable of limited relative angular displacement on either side of a neutral position under the action of the said control means, the said parts being connected to one another by elastic means for returning the parts to the neutral position, and assistor means which, in response to this angular displacement between the parts, are operable to act on the steering means in the same direction as the control means. In particular, the invention relates to such a device in which the said assistor means comprise a hydraulic power source, a hydraulic jack acting on the steering means, and a hydraulic distributor interposed between the hydraulic power system and the jack, the said distributor comprising stator means which are connected to the hydraulic power source and the hydraulic jack, and two corresponding rotors which are respectively integral in rotation with the two relatively movable parts and which are provided with passages for hydraulic fluid.

Usually, the elastic means for returning the two parts of the transmission element to the neutral position consist of a torsion bar interconnecting the parts; this torsion bar may extend inside the parts, which are then made hollow for this purpose.

The effect of forming the parts as hollow bodies is to increase the radial bulk of the unit. Moreover, it is necessary to carry out an adjustment so that, in the neutral position of elastic return, defined by the torsion bar, the juxtaposition of the hydraulic passages in the rotors is perfectly neutral so that the assistor means has in this position no effect on the steering.

It is an object of the present invention to provide a device for the power-assisted steering of a vehicle, of the kind referred to above, which does not have these disadvantages.

SUMMARY

According to the invention, a device for the power-assisted steering of a vehicle, of the kind indicated above, is characterised in that the elastic means for return of the two parts to the neutral position consist of at least one arm on one of the rotors, coupled to the other rotor, the said arm and the said hydraulic passages in the rotors being such that the neutral position of elastic return of the arm coincides exactly with a hydraulic neutral position of the passages in the rotors, in which position the assistor means has no effect on the steering means.

By virtue of this arrangement, the two parts of the transmission element do not need to be hollow and to possess a long central aperture which is expensive to produce, for receiving an axial member for the elastic return, such as a torsion bar; instead, the two parts can advantageously consist of solid shafts which have a low radial bulk and high strength.

Furthermore, by causing the rotors to perform not only a hydraulic function by means of their passages, but also an elastic return function by means of at least one elastic return arm, it is possible, solely by virtue of the construction of each rotor to achieve perfect coincidence of the hydraulic neutral position of the passages and the neutral position of elastic return, within the limits of machining tolerances, which, as shown by experiment, do not substantially influence the coincidence of these positions.

In an embodiment of the invention, in which the distributor comprises an axially stacked assembly composed of a first stator, two rotor plates which are respectively integral in rotation with one of the two said parts and are provided with hydraulic passages, and a second stator, the said stators being fed by the hydraulic power system and in turn feeding the hydraulic jack, the arm for the elastic return to the neutral position consists of a peripheral arm formed on one of the rotor plates, coupled either to the other rotor plate or to a peripheral arm of the other rotor plate.

According to an advantageous process for the manufacture of each rotor plate, a sheet-metal blank is taken and this is treated on a stamping installation so as to produce from this blank, using a socket punch, not only the hydraulic passages but also the elastic return arms, an initial adjustment being made once and for all and ensuring, with perfect reproducibility, a precise coincidence of the position of the hydraulic passages and the position of the elastic arms.

Once the rotor plates are thus mass-produced by stamping-out, it suffices to couple the arms, and a perfect coincidence of the hydraulic neutral position of the passages and the neutral position of elastic return is achieved without any adjustment during assembly, which permits precise operation with a simple and convenient construction.

In a variant in which the distributor comprises one stator and two concentric axial rotors, the elastic return arm is carried by one of the said rotors whilst being coupled to the other said rotor.

BRIEF DESCRIPTION OF THE DRAWINGS

FIGS. 6 and 7, FIGS. 8 and 9, FIGS. 10 and 11, FIGS 12 and 13 and FIGS. 14 and 15 are similar views to FIGS. 4 and 5, but relate respectively to five variants;

DESCRIPTION OF THE PREFERRED EMBODIMENTS

Reference will first be made to FIGS. 1 to 5, which relate, by way of example to the application of the invention to a device for the power-assisted steering of a motor vehicle.

The device comprises (FIG. 1) steering control means 10 which act on steering means such as drag links 11. The control means 10 comprise a steering wheel 12 and a steering column 13 in two parts 13A and 13B.

Figure 1:
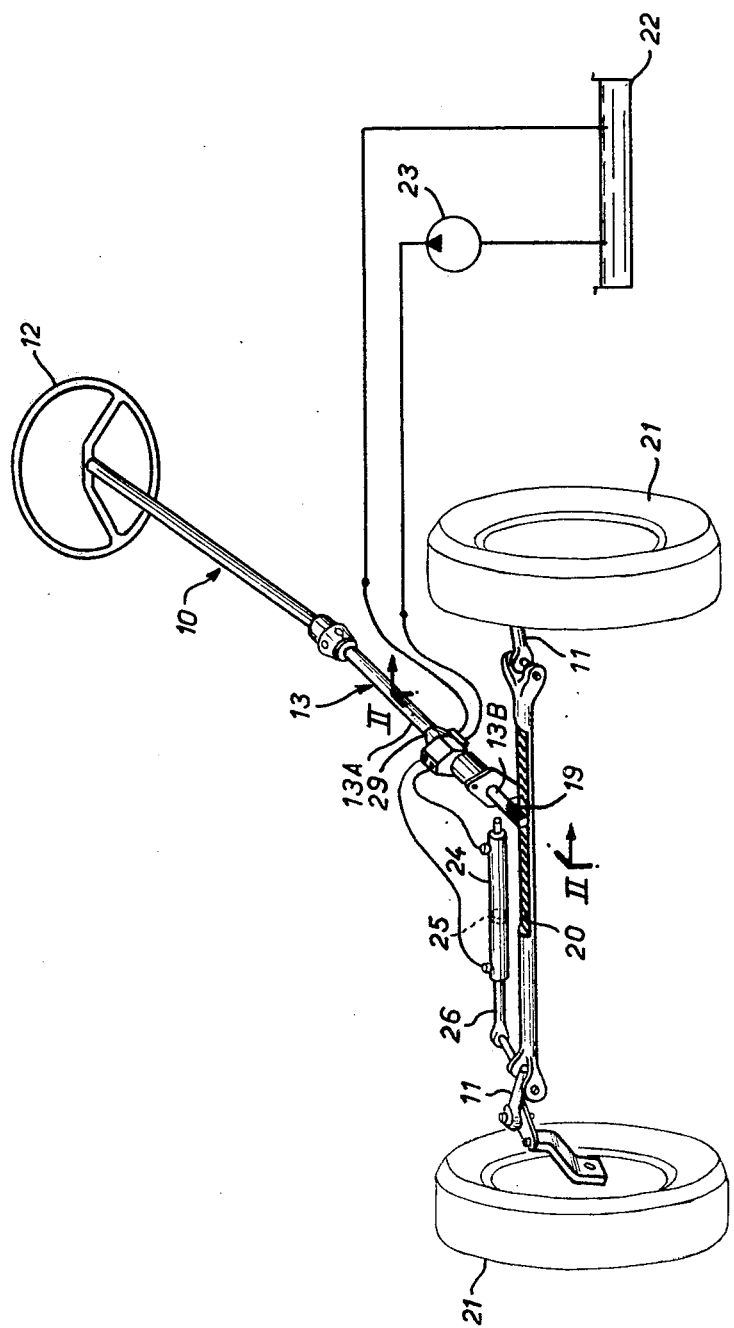
FIG. 1 is a schematic view, in perspective, of a device for the power-assisted steering of a motor vehicle, according to the invention.
Figure 2:
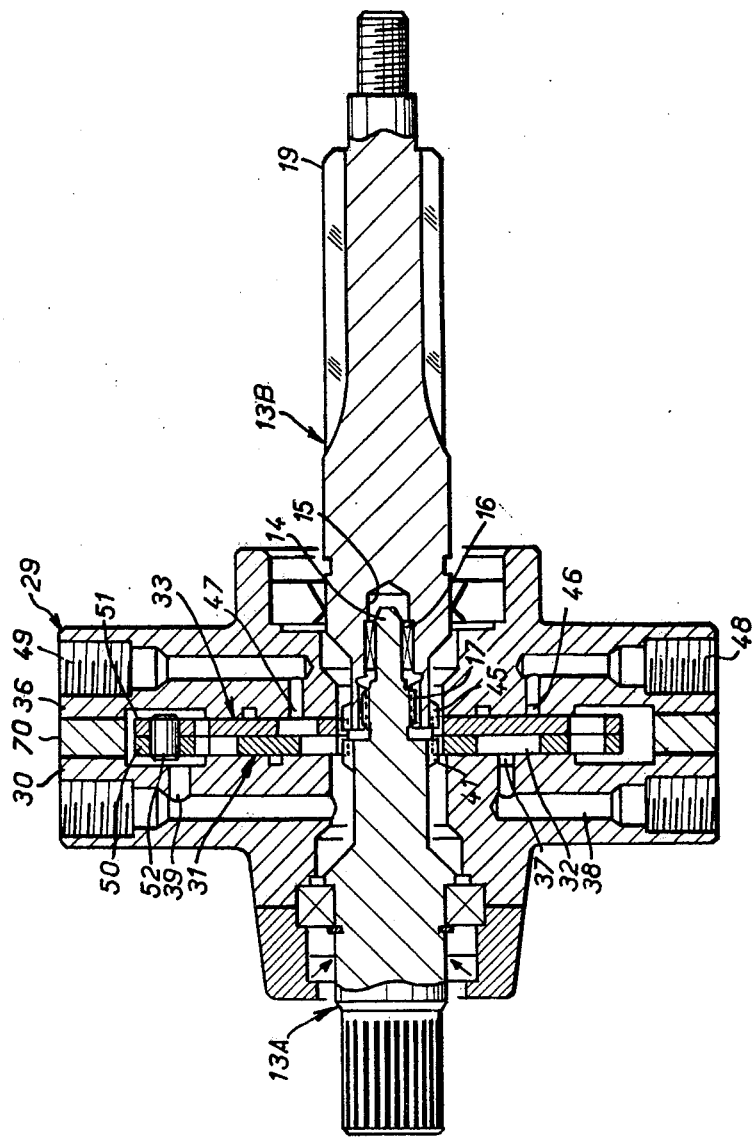
FIG. 2 is a view of this device, on a larger scale, in longitudinal section along the arrows II—II of FIG. 1.
Figure 3:
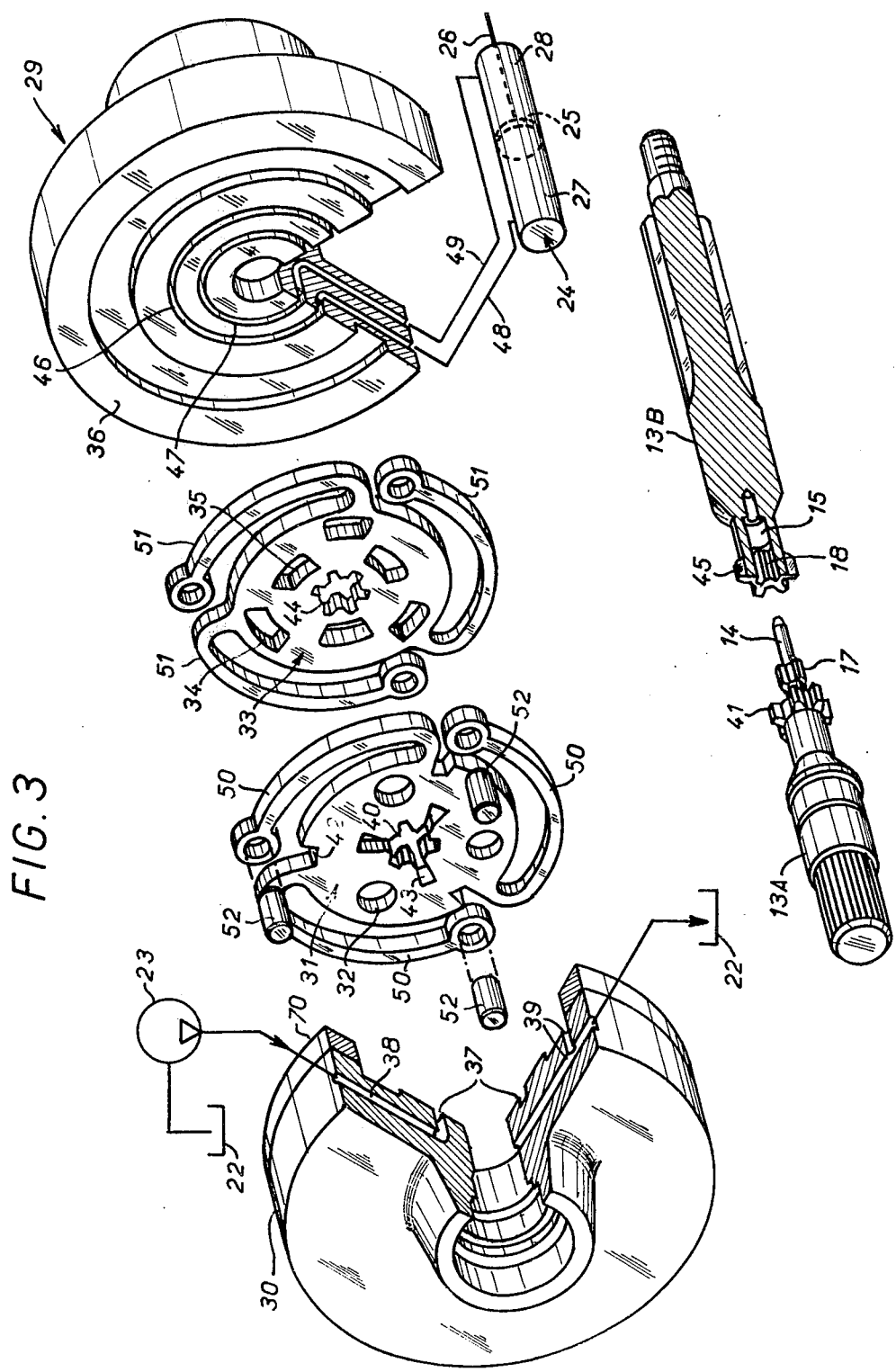
FIG. 3 is a schematic view, in exploded perspective, of the device of FIG. 2.
Figure 5:
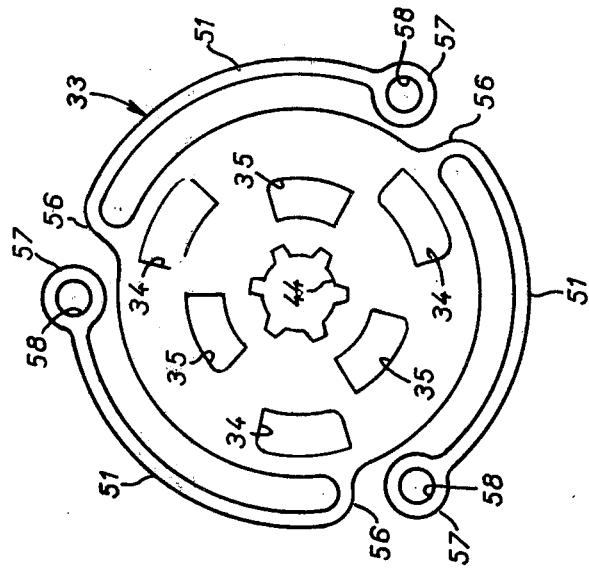
FIGS. 4 and 5 are views, in elevation, of the first rotor and the second rotor respectively.

The parts 13A and 13B consist (FIG. 3) of coaxial solid shafts which are arranged next to one another and are centred, relative to one another, by means of a spigot 14 on the part 13A, this spigot being engaged in a hole 15 in the part 13B, with the interposition of a bearing 16 (FIG. 2).

The part 13A possesses a grooved male bearing 17 which is engaged in a grooved female bearing 18, in the part 13B, with a limited relative angular play of a few degrees which allows a certain angular displacement between the parts 13A and 13B on either side of a neutral position defined below.

The part 13A is integral with the steering wheel 12, whilst the part 13B possesses a pinion 19 which engages with a rack 20 cooperating with the front wheels 21 of the vehicle via drag links 11.

A hydraulic power system 22, 23 comprises a reservoir 22 and a pump 23, drawing from this reservoir 22.

A hydraulic jack 24 has a piston 25, the rod 26 of which acts on the rack 20. The piston 25 (FIG. 3) defines two chambers 27 and 28 in the jack 24.

A hydraulic distributor 29 (FIGS. 1 to 3) is interposed between the pump 23 and the jack 24 and is sensitive to the angular displacement of the two parts 13A and 13B, relative to the neutral position of these two parts, so as to cause the jack 24 to act on the drag links 11 in the same direction as the control means 10.

The distributor 29 comprises (FIGS. 2 and 3) an axially stacked assembly composed of a first stator 30 fed by the hydraulic power system 22, 23 a first rotor plate 31 integral in rotation with the part 13A of the steering column 13 and provided with a circular series of hydraulic passages 32, a second rotor plate 33 integral in rotation with the part 13B of the steering column 13 and provided with two concentric circular series of hydraulic passages 34 and 35, and a second stator 36 feeding the hydraulic jack 24. The axial distance between the stators 30 and 36 is kept constant by means of a spacer 70.

The first stator 30 is formed with an annular groove 37 on its face adjacent to the first rotor plate 31. The groove 37 has the same mean radius as the passages 32 in the plate 31 and is connected to the pump 23 via a passage 38. Moreover, the stator 30 is formed with passages 39 for return to the reservoir 22.

The first rotor plate 31, which possesses the circular series of hydraulic passages 32, is provided with a grooved central hole 40 which is engaged, without play, on a grooved bearing 41 on the shaft 13A. The plate 31 has external peripheral slots 42 and internal peripheral slots 43, forming hydraulic passages for enabling the hydraulic fluid to return to the reservoir 22 via the passages 39 in the stator 30.

The two concentric circular series of hydraulic passages 34 and 35 in the second rotor plate 33 are capable of cooperating both with the passages 32 in the plate 31, for actuation of the jack 24, and with the slots 42 and 43, for return to the reservoir 22. For this purpose, the mean radius of the series of passages 32 has a value which is intermediate between the values of the mean radii of the series of passages 34 and 35. Moreover, the passages 34 can communicate with the slots 42 and the passages 35 can communicate with the slots 43. The plate 33 possesses a grooved central hole 44 which is engaged, without play, on a grooved bearing 45 on the shaft 13B.

The face of the second stator 36 is adjacent to the plate 33 which is formed with two concentric annular grooves 46 and 47. The latter are respectively connected, via passages 48 and 49, to the chambers 27 and 28 of the jack 24 and extend over the same mean radii as the two series of passages 34 and 35 in the plate 33.

Elastic means are provided for returning the shafts 13A and 13B to the neutral position, which corresponds, on the one hand, to a neutral position of elastic return within the limited angular play defined by the grooves 17 and 18, and, on the other hand, to a hydraulic neutral position of the passages 32, 34, 35, 42 and 43 in the plates 31 and 33, so that the output of the pump 23 returns to the reservoir 22 via 32, 34, 35, 42, 43 and 39, the auxiliary means having no effect on the steering means.

These elastic return means consist of peripheral arms 50 of the plate 31 and peripheral arms 51 of the plate 33. The arms 50 and 51 of the plates 31 and 33 are coupled by pins 52.

The elastic arms 50 and 51 of the plates 31 and 33, and the hydraulic passage 32 in the plate 31 and the hydraulic passages 34 and 35 in the plate 33, are such that the neutral position of elastic return of the arms 50 and 51 exactly coincides with the hydraulic neutral position of the passages 32, 34 and 35.

In greater detail (FIGS. 4 and 5), the plate 31 comprises three circumferential peripheral arms 50 having an arched shape which is concentric with the plate 31. Each arm 50 extends over a sector angle of slightly less than 120° and originates radially, at 53, from the periphery of the plate 31. The arm 50 possesses a widened end 54 which has a hole 55 intended for receiving a coupling pin 52.

Figure 4:
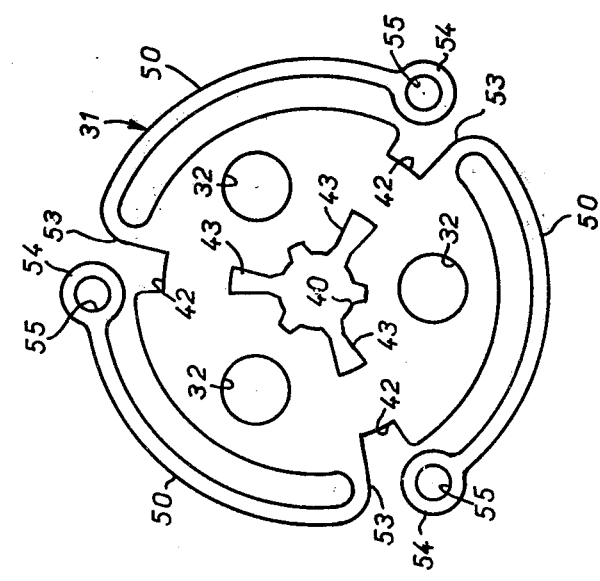

The arms 51 of the plate 33 (FIG. 5) are identical to, and are orientated in the same direction as, the arms 50 of the plate 31 (FIG. 4). In the same way as the arms 50, these arms 51 originate redially, at 56, from the periphery of the plate 33 and have a widened end 57 with a hole 58. When the two plates 31 and 33 are superposed in the rest position, that is to say when the driver is not turning the steering wheel 12 and hence when no force is being applied, the holes 55 and 58 coincide and the coupling pins 52 are engaged in these coincident holes 55 and 58.

In the rest position, the arms 50 and 51 remain exactly concentric with the plates 31 and 33. When a force is exerted angularly between the plates 31 and 33 and causes an angular displacement, the distance between the ends 53 and 55 of the arms 50 and the distance between the ends 56 and 57 of the arms 51 vary in opposite directions. One of the arms curves to allow a shortening of the distance between its ends, whilst the other flattens out to allow a lengthening of the distance between its ends. In fact, the arms 50 and 51 work exactly like a torsion spring.

Each plate 31 or 33 is made in a single piece which incorporates the arms 50 or 51. Each plate 31 or 33 is produced using a socket-punch, for example from a flat sheet-metal blank, by stamping out the various orifices 32, 40, 42 and 43, or 34, 35 and 44, and at the same time the arms 50 or 51, including their holes 55 or 58.

This results in a particularly simple and economic construction.

If the driver does not turn the steering wheel 12, the parts 13A and 13B are kept in the neutral position by means of the elastic return arms 50 and 51. The various grooves 37, 46 and 47 and the various passages 32, 34, 35, 42 and 43 are arranged relative to one another in such a way that the output of the pump 23, admitted through the passage 38 into the groove 37, enters the passages 32, and from there enters the passages 34 and 35 which are themselves connected to the slots 42 and 43 for return to the reservoir 22 via the passage 39. The pressure of the pump 23 thus has no effect in the chambers 27 and 28 of the jack 24.

The hydraulic neutral position of the passages exactly coincides with the elastic neutral position by virtue of the construction of each plate 31 or 33, during which the hydraulic passages 32, 34, 35, 42 and 43 and the elastic return arms 50 and 51 are simultaneously formed without risk of imprecision.

If the driver turns the steering wheel 12 in order to steer the wheels 21, the parts 13A and 13B are angularly displaced, relative to one another, in a direction determined by this action on the steering wheel 12, and the two plates 31 and 33 pass, for example, from the neutral position to a position in which the passages 34 overlap less with the passages 32, which implies an increase in the passage area for the fluid, and overlap more with the slots 42, which implies a decrease in the passage area for the fluid, whilst the passages 35 overlap more with the passages 32 and less with the slots 43.

Under these conditions, the output of the pump 23, passing from the groove 37 into the passages 32, is preferentially admitted through the passages 34 into the groove 46 and from there into the chamber 27 of the jack 24. The volume of the said chamber increases by pushing the rod 26 in the direction desired for steering. The volume of the chamber 28 of the jack 24 decreases and the hydraulic fluid from the chamber is driven through the passage 49 into the groove 47 and into the passages 35 which communicate with the slots 43 for return to the reservoir 22 via the passage 39. By virtue of the deformation of the arms 50 and 51, a reverse reaction to the angular displacement between the plates 31 and 33 is transmitted to the driver via the plates 31 and 33.

If the driver turns the steering wheel 12 in the other direction, operation is the same as that which has now been described, but the output of the pump feeds the chamber 28 of the jack.

In the event of failure of the auxiliary means, the effect of the action on the steering wheel 12 is to take up the limited relative angular play between the parts 13A and 13B, in the grooves 17 and 18, by overcoming the elastic resistance opposed by the arms 50 and 51. When a rigid connection is thus established in the grooves 17 and 18, steering is directly ensured by the action of the driver on the steering wheel 12.

In a variant (FIGS. 6 and 7), the arrangement is similar to that described above with reference to FIGS. 4 and 5, but the arms 51 of the plate 33 are orientated in the opposite direction to the arms 50 of the plate 31.

In another embodiment (FIGS. 8 and 9), the plate 31 possesses additional holes 60 near the points of attachment 71 of the arms 50 to the periphery of the plate 31. The same applies to the plate 33, which possesses additional holes 59 near the points of attachment 72 of the arms 51 to the periphery of the plate 33. The pins 52 couple the holes 55 in the arms 50 to the holes 59 in the plate 33 and couple the holes 58 in the arms 51 to the holes 60 in the plate 31.

In another construction (FIGS. 10 and 11), the arms 50 have a median point of attachment 61 to the plate 31 and have two end holes 62 for coupling to the other plate 33. The same applies to this other plate, for which the median points of attachment are shown by 63 and the end holes are shown by 64.

In yet another variant (FIGS. 12 and 13), the arms 50 have two end points of attachment 65 to the plate 31 and have an intermediate hole 66 for coupling to the other plate 33. The same applies to this other plate 33, for which the end points of attachment are shown by 67 and the intermediate holes are shown by 68.

In the embodiments which have been described hitherto, the two rotors 31 and 33 are both provided with elastic arms 50 and 51.

Figure 15:
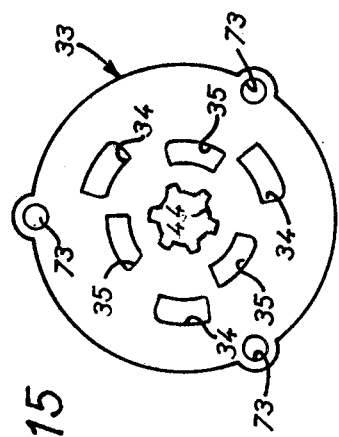
Figure 14:
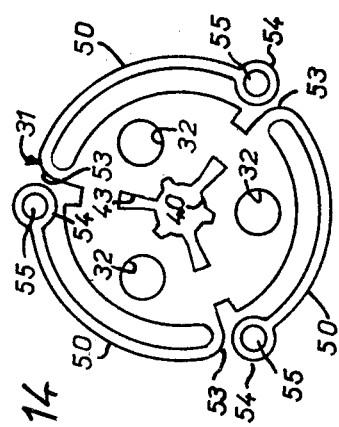

As a variant (FIGS. 14 and 15), only one of the rotors, for example the rotor 31 (FIG. 14), is provided with circumferential peripheral arms 50, whilst the other rotor 33 does not have arms. In this case, this rotor 33 possesses holes 73 for the coupling of the arms 50 by means of pins engaged in the end holes 55 in the arms 50.

Figure 17:
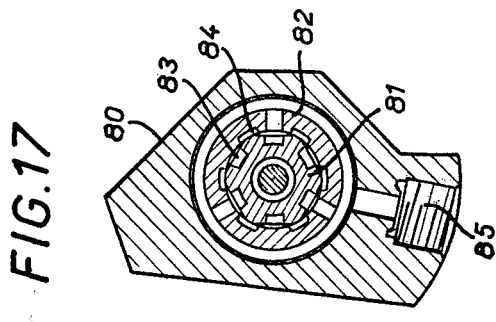

In another embodiment (FIGS. 16, 17 and 18), the distributor is of the kind which comprises a stator 80 and two concentric axial rotors 81 and 82 which are integral in rotation with the two parts 13A and 13B. Slots 83 and 84 are provided in the rotors 81 and 82 respectively (FIG. 17). The stator 80 possesses four orifices 85, 86, 87 and 88. The external part of the rotor 82 is given the shape of a collector 89 so that the consecutive slots 83 in the rotor 81 are alternately connected to the orifices 87 and 88. Likewise, the consecutive slots 84 in the rotor 82 are connected to the orifice 85 fed by the pump 23. The orifice 86 is connected to the reservoir 22. The orifices 87 and 88 are respectively connected to the two chambers 27 and 28 of the jack 24.

Figure 18:
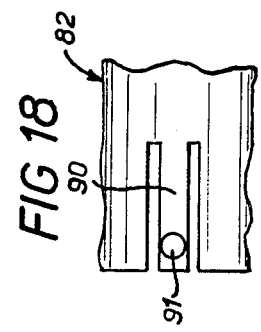
FIGS. 17 and 18 are partial views of this other embodiment, respectively along the arrows XVII—XVII and along the arrows XVIII—XVIII of FIG. 16.
Figure 16:
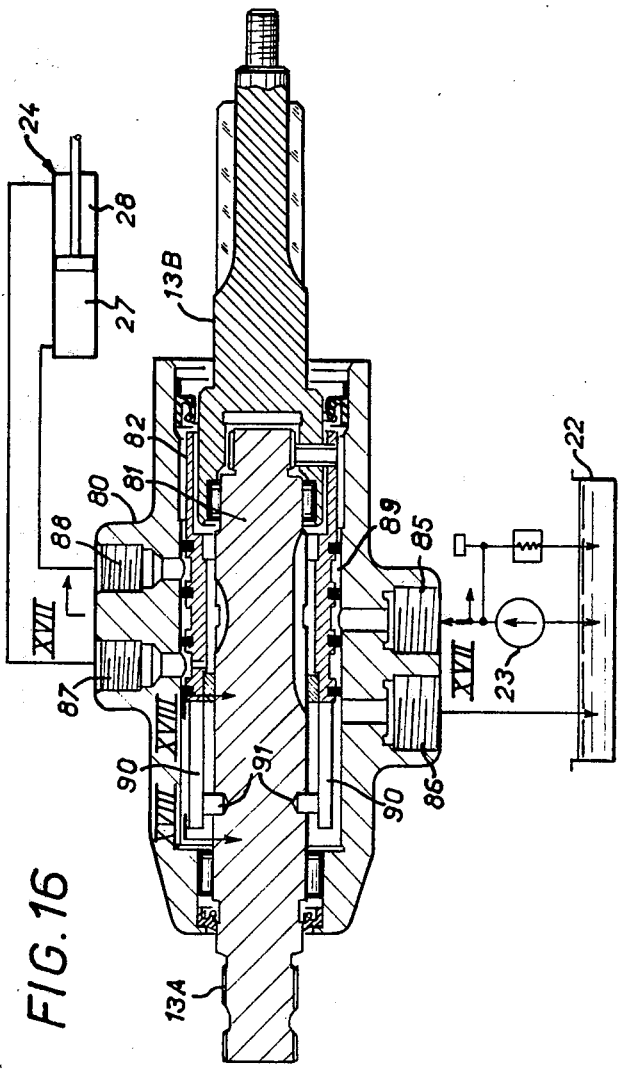
FIG. 16 is a similar view to FIG. 2, but relates to another embodiment.

The elastic arms 90 for return to the neutral position are carried by the rotor 82 and extend parallel to the axis (FIGS. 16 and 18). They are produced from the rotor 82 by cutting-out, the said rotor having the shape of a tubular sleeve. The arms 90 are coupled to the rotor 81 by means of pins 91 and operate like a bent beam or a spring subjected to bending.

In another arrangement (not shown), the arms 90 are circumferential peripheral arms and are located at the left-hand end of the apparatus (FIG. 16) and work like a torsion spring.

I claim:

1. A power-assisted steering device for a vehicle, comprising control means acting on steering means, said control means having a transmission element in two parts which are capable of limited relative angular displacement on either side of a neutral position under the action of said control means, said parts being connected to one another by elastic means disposed to return said parts to the neutral position, and assistor means responsive to an angular displacement of said parts, and operable to act on the steering means in the same sense as the control means, the said assistor means comprising a hydraulic power system, a hydraulic jack acting on the said steering means, and a hydraulic distributor interposed between the power system and the jack, the distributor comprising stator means which are fed by the hydraulic power system and which feed the hydraulic jack, and two rotors which are respectively integral in rotation with the two said parts and are provided with hydraulic passages, wherein said elastic means for returning said parts to the neutral position comprise at least one arm on one of the rotors coupled to the other rotor, the said arm and the said hydraulic passages in the rotors being such that the neutral position of elastic return of the arm coincides exactly with a hydraulic neutral position of the passages in the rotors, in which position the assistor means has no effect on the steering means.

2. A device according to claim 1, wherein the distributor comprises an axially stacked assembly comprising a first stator, two rotor plates which are respectively integral in rotation with one of the two said parts and are provided with hydraulic passages, and a second stator, the said stators being supplied by the hydraulic power system and being adapted to feed the hydraulic jack, said at least one arm comprising a peripheral arm on one of the rotor plates coupled to a peripheral arm on the other rotor plate.

3. A device according to claim 1, wherein the distributor comprises an axially stacked assambly comprising a first stator, two rotor plates which are respectively integral in rotation with one of the two said parts and are provided with hydraulic passages, and a second stator, the said stators being supplied by the hydraulic power system and being adapted to feed the hydraulic jack, said at least one arm comprising a peripheral arm on one of the rotor plates coupled to the other rotor plate.

4. A device according to claim 1, wherein said at least one arm comprises a circumferential peripheral arm having an arched shape which is concentric with one said rotor, said arm being formed with at least one point of attachment to said one rotor and at least one hole for coupling to the other rotor.

5. A device according to claim 1, wherein said at least one arm has an end point of attachment to one said rotor and an end hole for coupling to the other rotor.

6. A device according to claim 5, wherein said at least one arm is a plurality of arms all orientated in the same direction.

7. A device according to claim 2, wherein there is a plurality of said arms for each said plate and the arms of one plate are orientated in the same direction as the arms of the other plate.

8. A device according to claim 2, wherein there is a plurality of said arms for each said plate and the arms of one plate are orientated in the opposite direction to those of the other plate.

9. A device according to claim 5, wherein there is a plurality of said arms for each said rotor and each arm of one rotor is formed with a coupling hole near its end point of attachment to the other rotor.

10. A device according to claim 1, wherein said at least one arm of one rotor has a median point of attachment to said one rotor and has two end holes for coupling to the other rotor.

11. A device according to claim 1, wherein said at least one arm of one rotor has two end points of attachment to said one rotor and has a median hole for coupling to the other rotor.

12. A device according to claim 1, wherein the distributor comprises one stator and two concentric coaxial rotors, and the elastic return arm is carried by one of the said rotors and extends parallel to the axis, whilst being coupled to the other rotor.

13. A process for manufacturing a rotor for use in a power-assisted steering device as claimed in claim 1, comprising stamping the rotor from a sheet metal blank, wherein said hydraulic passages and said at least one arm are formed in the blank during the stamping operation.

* * * * *